United States Patent [19]

Allen

[11] 4,393,261
[45] Jul. 12, 1983

[54] HYDROCARBON RESIN AND PROCESS FOR PREPARATION

[75] Inventor: Robert P. Allen, Longview, Tex.

[73] Assignee: Eastman Kodak Company, Rochester, N.Y.

[21] Appl. No.: 421,632

[22] Filed: Sep. 22, 1982

[51] Int. Cl.$^3$ .............................................. C07C 3/18
[52] U.S. Cl. ..................................... 585/422; 585/19; 585/426
[58] Field of Search ................. 585/19, 400, 422, 426, 585/428

[56] References Cited

U.S. PATENT DOCUMENTS

| | | | |
|---|---|---|---|
| 1,982,707 | 12/1934 | Thomas | 585/19 |
| 3,091,650 | 5/1963 | Emrick et al. | 585/19 |
| 4,049,732 | 9/1977 | Bach et al. | 585/426 |
| 4,148,788 | 8/1978 | Schulz et al. | 585/426 |
| 4,192,824 | 3/1980 | Robinson et al. | 585/426 |

*Primary Examiner*—Delbert E. Gantz
*Assistant Examiner*—A. Pal
*Attorney, Agent, or Firm*—Clyde L. Tootle; Daniel B. Reece, III

[57] ABSTRACT

This invention relates to novel hydrocarbon resins and processes for their preparation. More particularly, the invention relates to a liquid hydrocarbon resin prepared by polymerizing norbornene and xylene with a Friedel-Crafts catalyst. The polymerized resin is hydrogenated to provide water white liquid hydrocarbon resins useful as liquid tackifiers in preparing hot-melt adhesive formulations.

12 Claims, No Drawings

HYDROCARBON RESIN AND PROCESS FOR PREPARATION

DESCRIPTION

This invention relates to hydrocarbon resins and processes for their preparation. More particularly, the invention relates to liquid hydrocarbon resins prepared by polymerizing norbornene and xylene with a Friedel-Crafts catalyst. The polymerized resin can then be hydrogenated to provide water white liquid hydrocarbon resins.

In accordance with the present invention, norbornene and xylene are polymerized with a Friedel-Crafts catalyst. The liquid hydrocarbon resin can be hydrogenated to provide a water white hydrocarbon resin which has good compatibility when used in formulating hot-melt adhesives.

The norbornene and xylene may be polymerized in a conventional manner with conventional Friedel-Crafts catalyst. However, boron trifluoride, preferably employed as moist boron trifluoride dietherate, was found to be the preferred catalyst as compared to the more widely used hydrocarbon resin catalyst, aluminum trichloride. However, any conventional Friedel-Crafts catalyst can be used. The polymerizations can be run either batchwise or continuous.

In batch runs the xylene and catalyst, either aluminum trichloride or moist boron trifluoride etherate, is added to a stirred flask and heated to a temperature of about 80° C. and under an inert atmosphere. The usual catalyst concentrations were in the range 0.4–2.0 weight percent. When moist boron trifluoride etherate is used the amount of catalyst employed is calculated as boron trifluoride. The norbornene is slowly added over an hour to the stirred flask and maintained at a temperature of less than 100° C. for about four hours. The preferred conditions using aluminum chloride as the catalyst were 1.5 percent catalyst for a reaction temperature of 60°–100° C. for a period of about 2 to 4 hours. The preferred conditions with boron trifluoride are 0.6 percent catalyst at a temperature of 80° C. to 100° C. for a period of 4 to 5 hours.

The reaction can also be carried out at higher reaction temperatures such as 150° C. to 170° C. However, the reaction has to be carried out in an autoclave or under pressure. Generally, less reaction time is required for such reactions. The norbornene and xylene are employed on a weight ratio of about 2:1 to 10:1. At ratios of less than 2:1 the product formed is primarily a product containing a single norbornene and a single xylene and very little resin containing a plurality of such groups. At ratios greater than 10:1 the product formed is primarily polymerized norbornene which is a solid resin rather than a liquid resin. The preferred ratio of norbornene and xylene is about 3:1 to about 7:1, most preferred 3:1 to 5:1, which provides a liquid resin at the optimum yield at a viscosity of 1,500 to 10,000 cp. at 38° C. and has a Gardner color of about 8 to 18.

In the continuous runs a catalyst slurry or solution and the xylene and norbornene were added to a stirred reactor maintained at the polymerization temperature. The overflow from the first reactor passed into a second reactor. With aluminum chloride catalyst the preferred concentration was 1.0 percent by weight with the temperatures of the first reactor at 70° C. and the second reactor at 90° C. The most suitable addition rate gave an approximate residence time of 12 hours in both reactors.

The crude resin reaction mixture was then quenched or diluted with a hydrocarbon solvent such as mineral spirits, extracted with an aqueous caustic solution to destroy the catalyst, dried by azeotropic distillation. The crude resin can be isolated from the reaction mixture by gas stripping. The crude resin has a Gardner color of about 8 to 18 and a viscosity of about 1,500 cp. at 30° C. to about 7,000 cp. at 66° C. The crude resin can also be hydrogenated under conventional conditions to produce a water white liquid hydrocarbon resin having a Gardner number of 2 or less.

The hydrogenation can be carried out using a nickel-supported catalyst, such as Harshaw Ni-3266E, at a temperature of 220°–320° C. and 3000 psig hydrogen for a period of 1–2 hours for a batch operation. From the continuous polymerization unit the crude resin solution was passed continuously through two catalyst beds; the first contained 0.5 percent palladium on alumina catalyst maintained at a temperature of about 220° and 250–500 psig hydrogen, and the second reactor used a supported nickel catalyst, such as Harshaw's Ni-3266E, at a temperature of about 240°–320° C. and 2900 psig hydrogen. The hydrogenation time was generally 1–2 hours in each reactor to provide a low color resin having a Gardner color of about 2 or less.

The hydrogenated resin solution is then filtered to remove catalyst fines and concentrated by means of vacuum stripping or gas stripping to produce a water white liquid resin.

This invention can be further illustrated by the following examples, although it will be understood that these examples are included merely for purposes of illustration and are not intended to limit the scope of the invention unless otherwise specifically indicated.

EXAMPLE 1

This example illustrates the batch preparation of a liquid hydrocarbon resin based on norbornene and xylene using aluminum chloride as the catalyst.

To 75 grams of xylene was added 4.5 grams of aluminum chloride under an inert atmosphere at ambient temperature. Over a period of one hour 250 grams of norbornene and heptane (90/10) were added and the mixture was heated to about 80° C. The temperature after one hour was raised to 100° C. by external heating for 4 hours. The reaction product was diluted with 100 ml mineral spirits and washed twice while hot with about 20 ml of a 10 percent caustic solution. The organic phase was then dried by azeotropic distillation and filtered. The filtrate was subjected to hydrogenation in a mineral spirits solution over a nickel catalyst at 240° and 3000 psig hydrogen for one hour. The product was filtered and the solvent and low molecular weight polymer removed at 10 mm and an overhead temperature of 160°. The resin was obtained in 27 percent yield based on total monomers present. The resin had a Gardner color of about 1 and a viscosity of about 2,000 cp at 38° C.

EXAMPLE 2

The process of Example 1 is repeated except that 4.5 grams of boron trifluoride dietherate is used in place of 4.5 grams of aluminum chloride. The resin was obtained in 48 percent yield based on the total monomers present. The resin after hydrogenation according to the procedure of Example 1 had a Gardner color of less than 1 and a viscosity of about 1500 cp. at 38° C.

EXAMPLE 3

To 150 grams of the 90/10 mixture of norbornene and xylene was added 3 grams boron trifluoride dietherate, in a 300 ml autoclave. The autoclave was sealed and heated to 150° C. for two hours. The reaction showed a slight exotherm and the temperature rose to 180° before cooling was applied. The temperature was maintained at 150° for two hours, cooled and diluted with 100 ml mineral spirits. The catalyst was removed by a washing with 20 ml of a 10% caustic wash and the resin product was worked up as described in the previous examples. The resin was obtained in 65 percent yield. The very viscous liquid resin had a Gardner color of about 2 and a viscosity of about 6,700 cp. at 66° C.

EXAMPLE 4

This example illustrates the preparation of a pressure-sensitive adhesive using the liquid tackifying oil of the present invention.

A mixture of weight of 19 percent hydrocarbon oil of Example 1, 50 percent hydrocarbon resin, 30 percent polystyrene/polyisoprene/polystyrene resin, 0.1 percent tetrakis[methylene-3',5-di-t-butyl-4-hydroxyphenyl)propionate]methane (Irganox 1010), and 0.35 percent lauryl stearyl thiodipropionate (Cyanox 1212) was heated in a nitrogen atmosphere to 177° C. until molten. The melt was then mechanically stirred for 30 minutes until homogeneous and tested as a hot-melt adhesive. The results are summarized below.

Probe Tack—1130 grams
Softening Point, °C.—90
90° Peel Strength, lbs./in. width 2.3
Shear Adhesion >100 hours
180° Peel Strength, lbs./in width 9.5
Viscosity (350° F.), cp 8700

The hydrocarbon tackifying resins prepared according to the present invention are useful in blends with solid tackifier and rubber copolymers to produce hot-melt adhesives. These hydrocarbon resins can be used as substitutes for liquid terpene or liquid rosin-based resins or for any of the hydrogenated, aliphatic liquid resins that are commercially available. Other uses for these resins include rubber compounding, highway markings, inks, textile sizing or in many other applications where terpene, rosin or hydrocarbon resins are normally used.

The invention has been described in detail with particular reference to preferred embodiments thereof, but it will be understood that variations and modifications can be made within the spirit and scope of the invention.

I claim:

1. A process for preparing a liquid hydrocarbon resin having a Gardner color of about 8 to 18 and a viscosity of about 1,500 cp. at 38° C. to about 7,000 cp. at 66° C. comprising polymerizing a mixture of xylene and norbornene with a Friedel-Crafts catalyst at a temperature of about 60° C. to about 170° C. for a period of from 1 to 4 hours.

2. A process according to claim 1 wherein said Friedel-Crafts catalyst is aluminum trichloride.

3. A process according to claim 1 wherein said Friedel-Crafts catalyst is moist boron trifluoride ethereate.

4. A process for preparing a liquid hydrocarbon resin having a Gardner color of about 8 to 18 and a viscosity of about 1,500 cp. at 38° C. to about 10,000 cp. at 38° C. comprising polymerizing a mixture of xylene and norbornene with a Friedel-Crafts catalyst at a temperature of about 60° C. to about 170° C. for a period of from 1 to 4 hours.

5. A process according to claim 4 wherein said Friedel-Crafts catalyst is aluminum trichloride.

6. A process according to claim 4 wherein said Friedel-Crafts catalyst is moist boron trifluoride etherate.

7. A process for preparing a liquid hydrocarbon resin having a Gardner color of about 2 or less and a vicosity of about 1,500 cp at 38° C. to about 7,000 cp. at 66° C. comprising polymerizing a mixture of xylene and norbornene with a Friedel-Crafts catalyst at a temperature of about 60° C. to about 170° C. for a period of from 1 to 4 hours and hydrogenating to provide a water white liquid hydrocarbon resin.

8. A process according to claim 7 wherein said Friedel-Crafts catalyst is aluminum trichloride.

9. A process according to claim 7 wherein said Friedel-Crafts catalyst is moist boron trifluoride.

10. A process for preparing a liquid hydrocarbon resin having a Gardner color of about 2 or less and a viscosity of about 1,500 cp. at 38° C. to about 10,000 cp. at 38° C. comprising polymerizing a mixture of xylene and norbornene with a Friedel-Crafts catalyst at a temperature of about 60° C. to about 170° C. for a period of from 1 to 4 hours and hydrogenating to provide a water white liquid hydrocarbon resin.

11. A process according to claim 10 wherein said Friedel-Crafts catalyst is aluminum trichloride.

12. A process according to claim 10 wherein said Friedel-Crafts catalyst is moist boron trifluoride.

* * * * *